UNITED STATES PATENT OFFICE.

CHARLES L. NORTON, OF MANCHESTER, MASSACHUSETTS, ASSIGNOR TO ASBESTOS WOOD COMPANY, A CORPORATION OF MAINE.

REFRACTORY MATERIAL AND PROCESS FOR PRODUCING IT.

No. 847,293.     Specification of Letters Patent.     Patented March 12, 1907.

Application filed June 7, 1906. Serial No. 320,670.

*To all whom it may concern:*

Be it known that I, CHARLES L. NORTON, a citizen of the United States, and a resident of Manchester, in the county of Essex and State of Massachusetts, have invented new and useful Improvements in Refractory Materials and Processes for Producing Them, of which the following is a specification.

My invention relates to the art of producing refractory materials from substances of which asbestos is a type; and its object is the manufacture of integral finished articles or material products adapted to be wrought into structures of miscellaneous character— as, for instance, doors, partition-walls, sheathings, floors, protective-receptacles, insulating blocks for electrical apparatus, switchboards, &c.

My invention consists in a new process of manufacture and in the product of such manufacture, broadly regarded as a new composition of matter irrespective of form, proportions, or specific utility.

The material which I employ as the main basis for my new process and product is asbestiform fiber—that is to say, inorganic fibrous material which is composed chiefly of and sometimes wholly of silicate of magnesia—which appears in nature as "asbestos" (popularly so called) or the serpentine rock which forms the natural matrix for asbestos or as modifications of hornblende. With this basic material I employ a bonding material which with the asbestiform basic material enters into a mutual relation which I believe involves a more intimate association than mere mechanical cohesion. The bonding material which I select for this purpose is magnesium oxid, (which may be obtained by calcination of magnesium carbonate,) which when associated with asbestiform fiber and water under proper conditions of pressure knits or bonds the compound mass into a uniform, homogeneous, and practically indestructible substance.

I have observed that the serpentine, which is closely associated in nature with fibrous asbestos, though apparently a rock which reduces mechanically to a hard granular gravel, will when still further comminuted by grinding become reduced to a pulp which instead of being a fine dust or assemblage of hard minute granules is itself also essentially fibrous and closely analogous in its character and "feel" to a mass of pulped asbestos fibers. The pulped serpentine discloses under the microscope a fibrous structure, the individual particles being extremely short and fine.

Serpentine pulp being an asbestiform fiber, is well adapted to use as the basic material for my process and product. It may be mixed with longer asbestos fiber, if desired, but for most purposes may be used without such admixture. This circumstance I regard as of considerable practical importance, because, so far as I am informed, the serpentine matrix of asbestos has heretofore been regarded as mere waste material without any commercial value. As the proportionate quantity of serpentine which has to be worked to obtain commercial asbestos is very large, the advantage of using the waste rock instead of the more valuable longer-fibered asbestos is obvious.

In preparing magnesium oxid for my bonding material I first reduce a substantially pure magnesite or magnesium carbonate to a fine powder, say, fine enough to pass through a screen of one hundred and forty mesh. Comminution of magnesium carbonate facilitates its thorough and uniform calcination. Moreover, the magnesium oxid produced by calcination of a finely-powdered carbonate is correspondingly comminuted, and I have discovered that the bonding or cementitious property of the oxid increases to a remarkable degree as the particles thereof are decreased in size. The calcination should not be excessive. A dull red heat will effect the proper calcination satisfactorily. If the magnesite (magnesium carbonate) is put in the kiln in lumps, as limestone is, the calcination is liable to be confined to the surface of the lumps unless the heat employed be intense, when, though the whole of each lump may be calcined, the exterior is liable to be over-calcined and proportionately unsuitable to my purpose. Magnesium oxid may be obtained from other sources and by other processes, and if used in the manner hereinbelow described will serve the purpose.

As the comminution of the magnesium oxid employed is an important factor in the process, I have used in practice a precipitated magnesium carbonate, such as is obtained by the chemical reduction of dolomite, whereby the magnesium carbonate is separated from the calcium carbonate which exists together in that substance. This precipitated magnesium carbonate is an impalpable powder capable of sifting freely through bolting-cloth, and from the calcination thereof I obtain a magnesium oxid which is correspondingly comminuted and whose cementing capacity under the conditions of my process hereinbelow described is very high.

Having procured asbestiform fiber (preferably pulped serpentine, either with or without longer fibers of similar character) and properly comminuted magnesium oxid, I mix the two intimately, using any suitable mixing-machine for the purpose, employing proportions of about eighty per cent. asbestiform fiber and twenty per cent. magnesium oxid, by weight. The magnesium oxid should be used when it is fresh—i. e., before hydration has set in to any considerable degree—because I have observed that the process of forming my new composition of matter should be carried on while hydration of the magnesium oxid is in progress or at least before hydration is completed. If, therefore, the oxid has been hydrated to any considerable degree before my process is performed the result will be correspondingly imperfect. The proportions of fiber and magnesium oxid may be varied without substantial departure from my process and without varying the product thereof except in degree. As a rule, if the proportion of bonding material (magnesium oxid) is increased the consistency of the product becomes more stony, whereas if the basic asbestiform fiber is increased in proportion to the bonding material the product becomes more woody, though in neither case is any lamination or grain observable in the product.

When the compound of asbestiform fiber base and magnesium oxid is well mixed, I make a pulp thereof with water. No strict rule as to the proportion of water need be observed, because the succeeding step in the process takes care of any reasonable excess of water that may be present. Upon the addition of water to the mixture hydration begins, and while hydration is in progress I place the wet pulp on a filter-press in any suitable box or mold and apply pressure to the pulp. The surplus water is squeezed out, coming from the press substantially clear, although it may contain one or both of the main ingredients in solution or suspension to a trifling degree. I employ a pressure of from fifteen hundred to two thousand five hundred pounds per square inch of superficial area of the pulp in the mold. As the surplus water is expressed from the mass and the effective pressure thereon increases the behavior of the mass of pulp appears to be determined when a critical pressure is reached. This critical pressure cannot be exactly determined beforehand. In practice I have found it to be within the limits stated above. When it is reached, the mass, though composed of solid particles originally and though the surplus of water has been for the most part, at least, expressed, behaves more like a homogeneous liquid than a solid in that great lateral pressure is exerted on the mold or box. I believe that when pressure is brought to bear on the mixture during the progress of hydration the particles of asbestiform fiber and calcined magnesium carbonate become, as it were, mutually soluble. They come apparently to a state of flux when the critical pressure is attained, and this arrival at a state of flux marks the attainment of the critical pressure. Whether this be the true explanation or not, the mass under pressure takes a preliminary "set" and may be removed from the mold as a solid slab, block, or molded article. The preliminary set is, however, not the final stage in the manufacture. Time should be given for a permanent set to take place; otherwise the molded object is liable to sag, warp, or bend from its true form. Therefore I place the molded article upon a proper support, or preferably in a setting-press, where a comparatively light pressure—say twenty or thirty pounds per square inch—is brought to bear upon it, and there leave it for a period of from twenty-four hours to several days, according to the shape or bulk of the object itself. During this period the permanent set takes place, and afterward the molded article is ready for use.

The proportions, size, and weight of the piece of compressed composition which comes from the mold will determine the character of support or pressure desirable during the secondary setting. Some objects of small size or simple shape need only be laid on a support. Others will require firmer holding during this period. The secondary or final setting of the product is due, I believe, to dehydration of the hydrated oxid. This dehydration probably involves only a partial loss of the water originally taken up. Heat—say that obtainable from a steam-heated support or press—will accelerate the secondary setting process.

When my new material is to be used for electrical insulating purposes, care should be taken in the first place to cleanse the asbestiform fiber of dirt or grit, which it usually contains. This may be done by cleansing or carding the fiber in any suitable machine, hand cleansing, though possible, being obviously impracticable if large quantities are to be manipulated. The presence of grit in the finished product, besides impairing its insulating quality, degrades it in tensile strength. The resulting product is compact, homogeneous, fireproof, an excellent electrical insulator, can be worked with tools, bored, nailed, screwed, is sufficiently stiff and strong to be used for door-frames or doors, takes a high polish, and receives and holds superficial coats of paints or varnishes readily.

I claim as my invention—

1. The process of treating asbestiform fiber which consists in forming magnesium hydroxid in intimate mixture with the fiber, under pressure.

2. The process of treating asbestiform fiber which consists in making with the fiber a mixture of magnesium oxid and water, and compacting the solids under pressure while wet.

3. The process of treating asbestiform fiber which consists in making with the fiber a mixture of magnesium oxid and water, expressing the excess of water and compacting the solids under pressure while wet.

4. The process of treating asbestiform fiber which consists in making with the fiber a mixture of magnesium oxid and water under conditions conducive to the formation of magnesium hydroxid, and compacting the solid ingredients under pressure while wet.

5. The process of treating asbestiform fiber which consists in making with the fiber a mixture of magnesium oxid and water, and compacting the solids under pressure while hydration is in process.

6. The process of treating asbestiform fiber which consists in making with the fiber a mixture of magnesium oxid and water, and compacting the solids under pressure sufficient to produce therein a condition of flux.

7. The process of treating asbestiform fiber which consists in making with the fiber a mixture of magnesium oxid and water, compacting the solids under pressure while wet, until they assume a preliminary set, and thereafter supporting the resulting product until it sets permanently.

8. The process of treating asbestiform fiber which consists in making with the fiber a mixture of magnesium oxid and water, compacting the solids under pressure while wet until they assume a preliminary set, and thereafter subjecting the resulting product to reduced pressure until it sets permanently.

9. The process of treating asbestiform fiber which consists in making with the fiber a mixture of calcined precipitated magnesium carbonate, and water, and compacting the solids by pressure while wet.

10. The process of treating asbestiform fiber which consists in making with the fiber a mixture of calcined precipitated magnesium carbonate and water, and compacting the solids under pressure while hydration is in process.

11. The process of treating asbestiform fiber which consists in mixing a substantial preponderance (by weight) of fiber, with magnesium oxid and water, and subjecting the mixture to pressure.

12. The process of treating asbestiform fiber which consists in mixing about eighty per cent. (by weight) of fiber with about twenty per cent. (by weight) of magnesium oxid, and water, and subjecting the mixture to pressure.

13. A compacted felt of asbestiform fiber, bonded with magnesium hydroxid.

14. A compacted felt of asbestiform fiber bonded with hydrated calcined precipitated magnesium carbonate.

Signed by me at Boston, Massachusetts, this 4th day of June, 1906.

CHARLES L. NORTON.

Witnesses:
ODIN B. ROBERTS,
JOSEPH T. BRENNAN.